Dec. 1, 1936.   W. B. FORSYTH, JR   2,062,704
DISHWASHING MACHINE
Filed Feb. 20, 1934   9 Sheets-Sheet 4
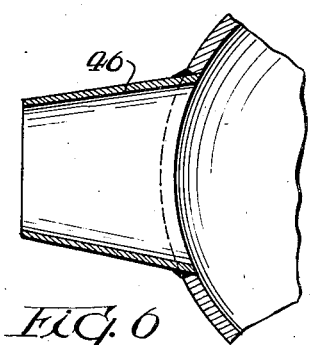
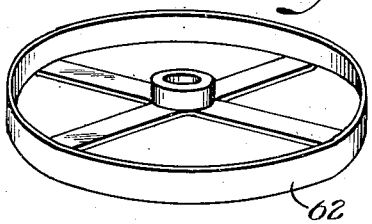
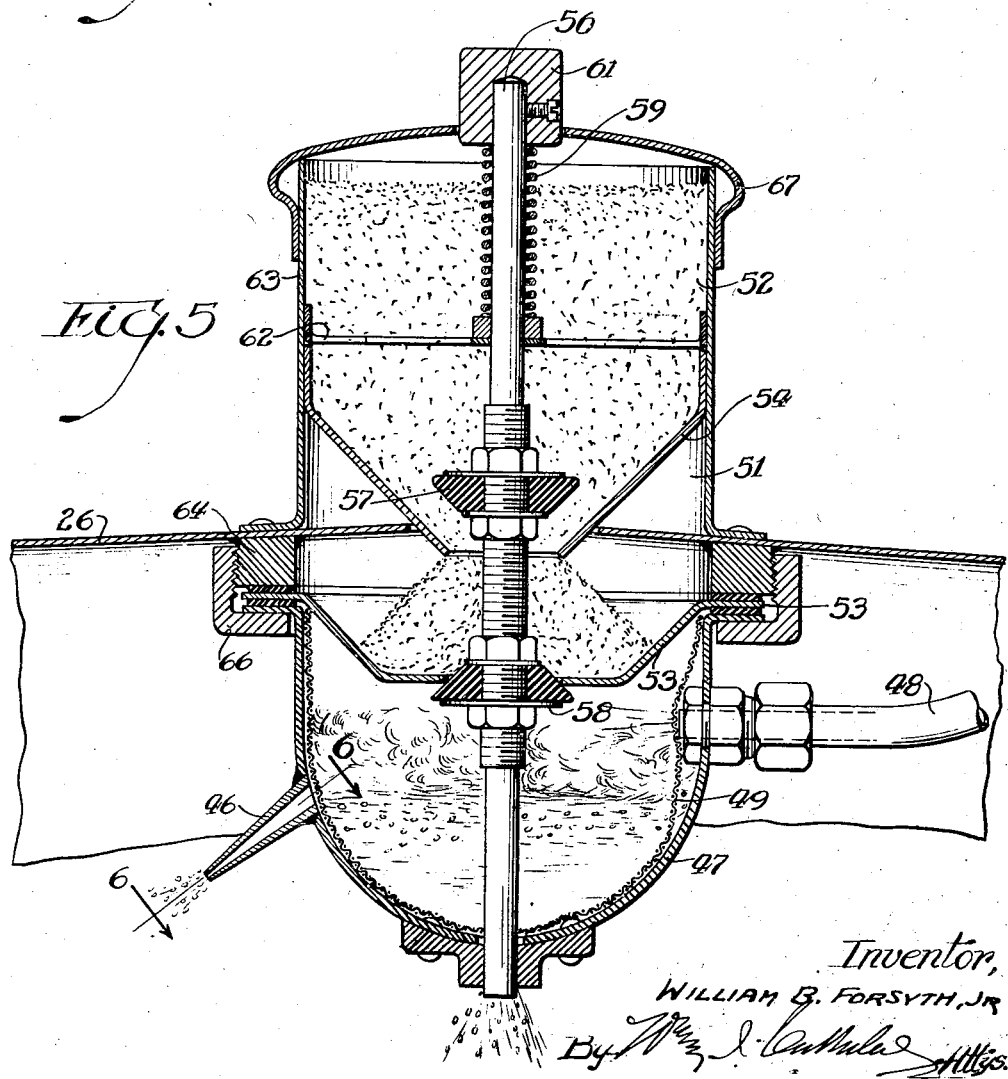
Inventor,
WILLIAM B. FORSYTH, JR

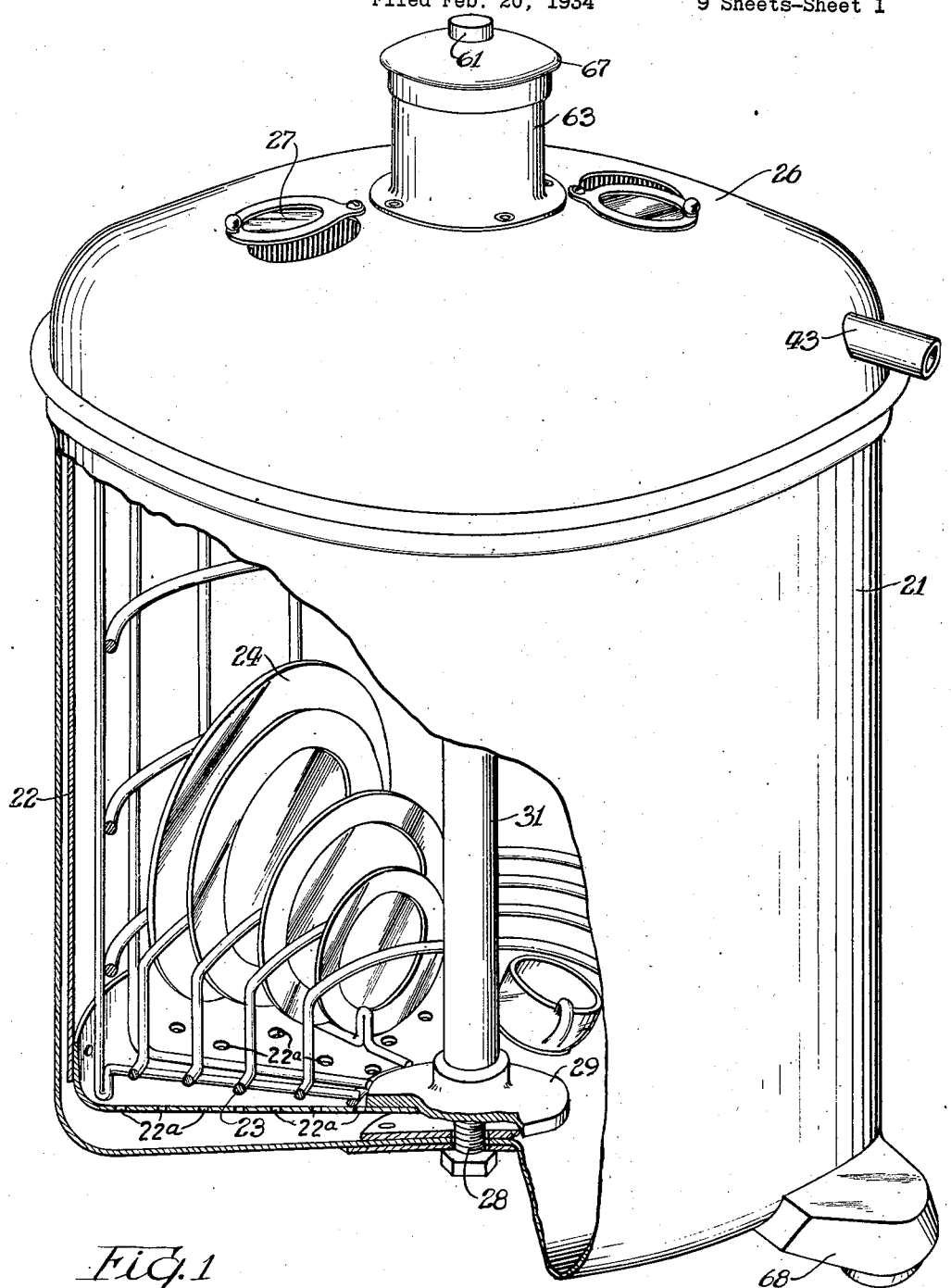

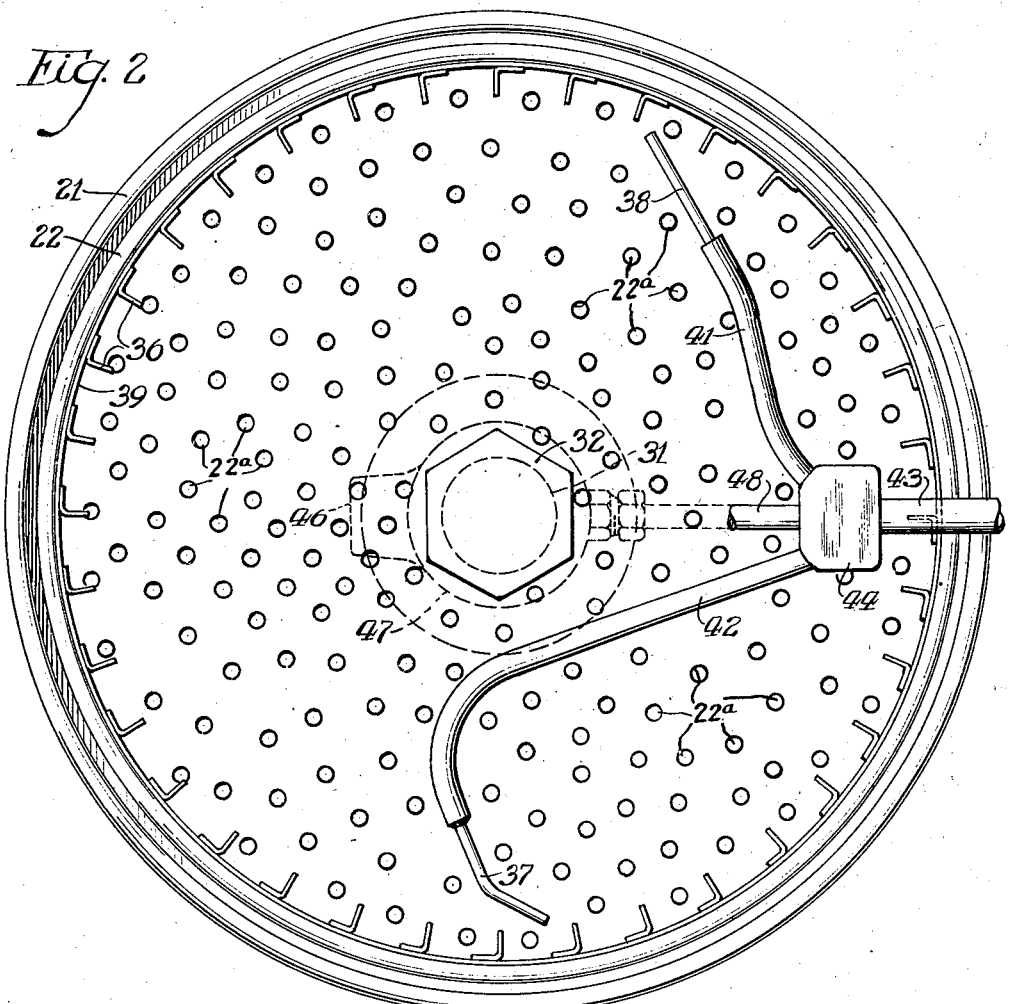
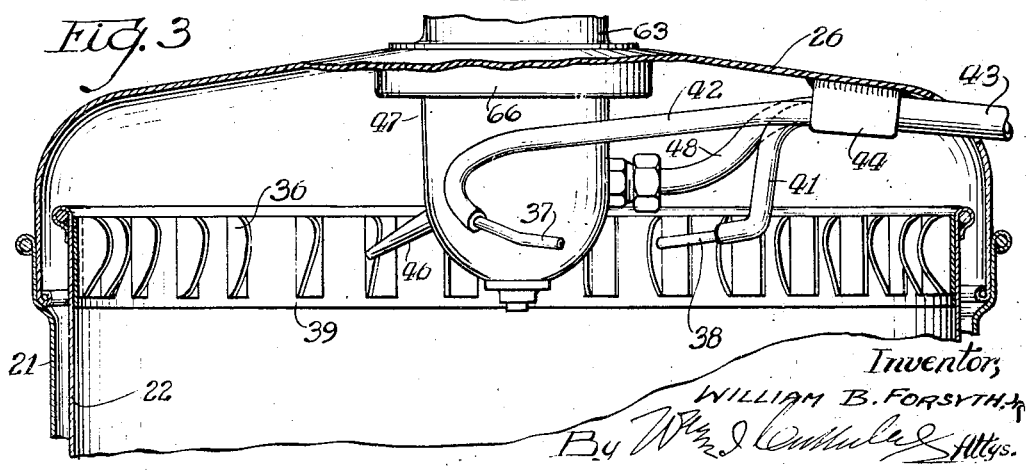

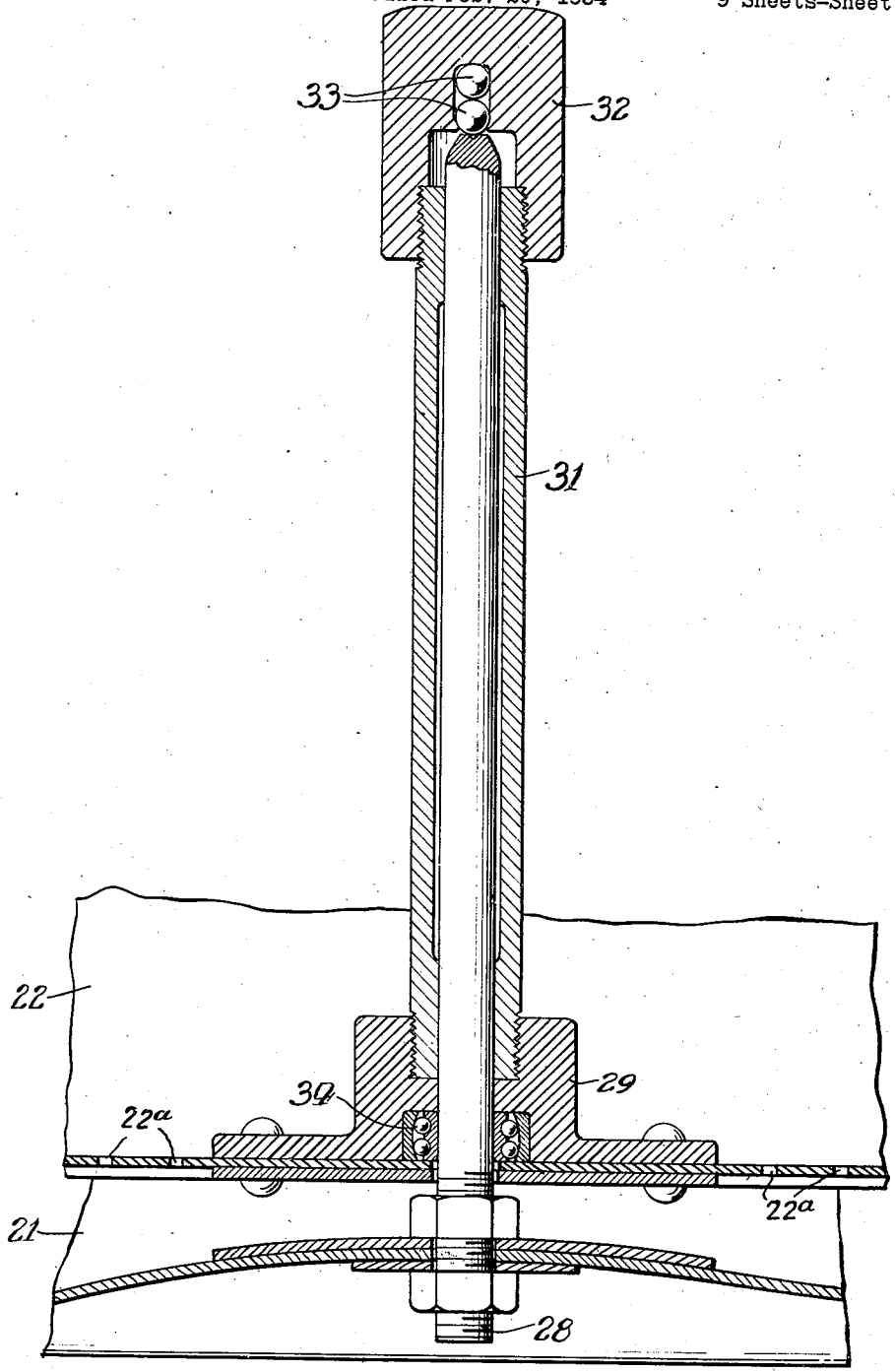

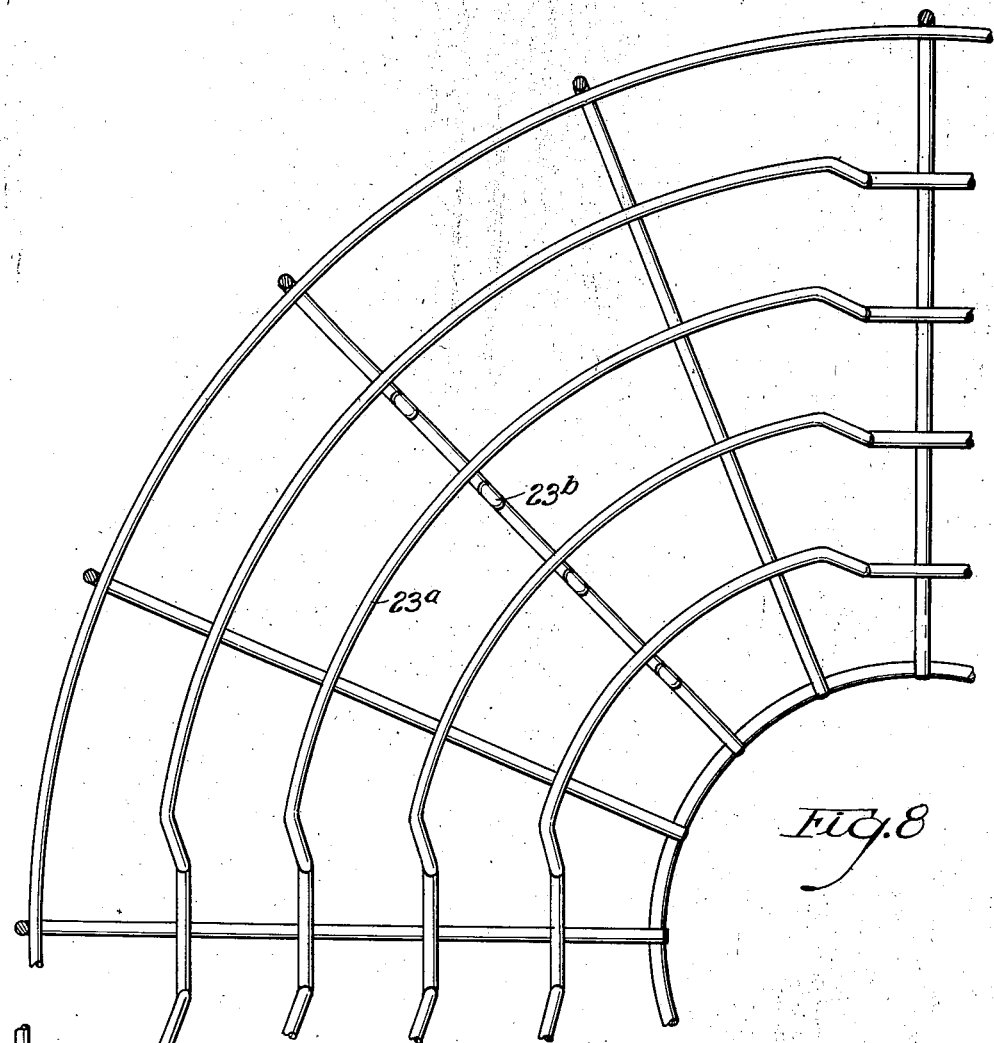
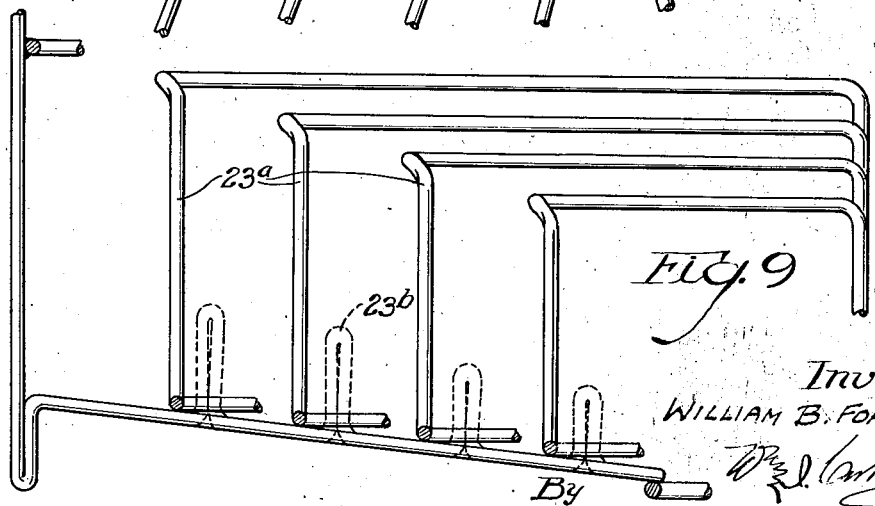

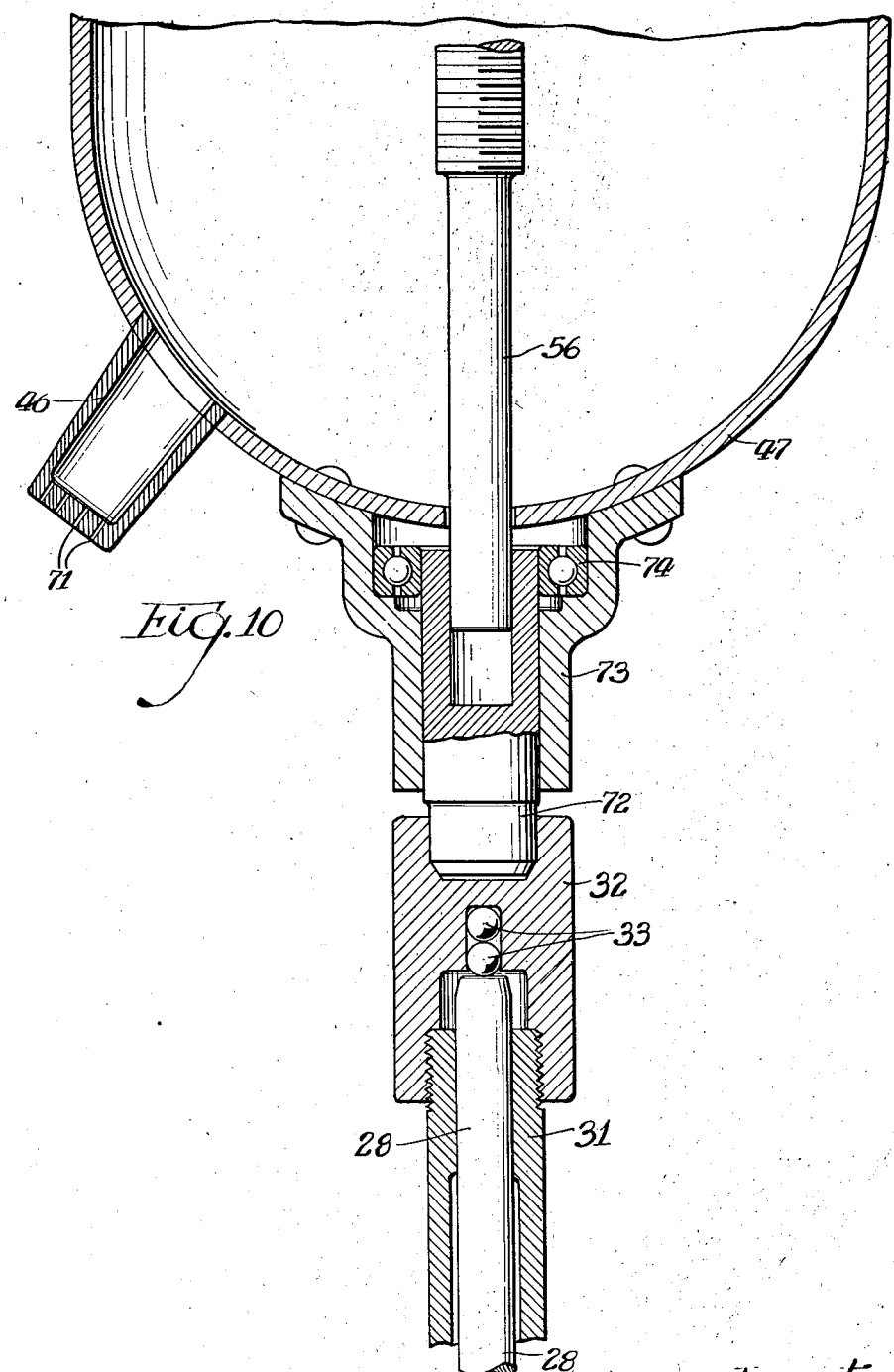

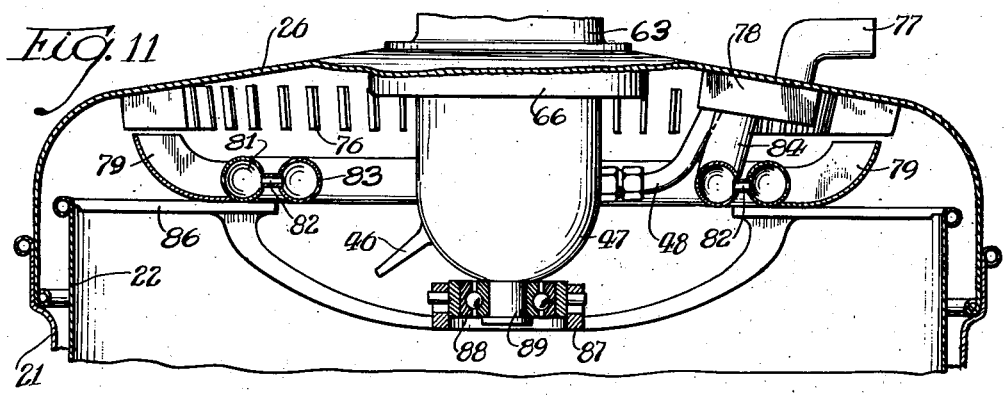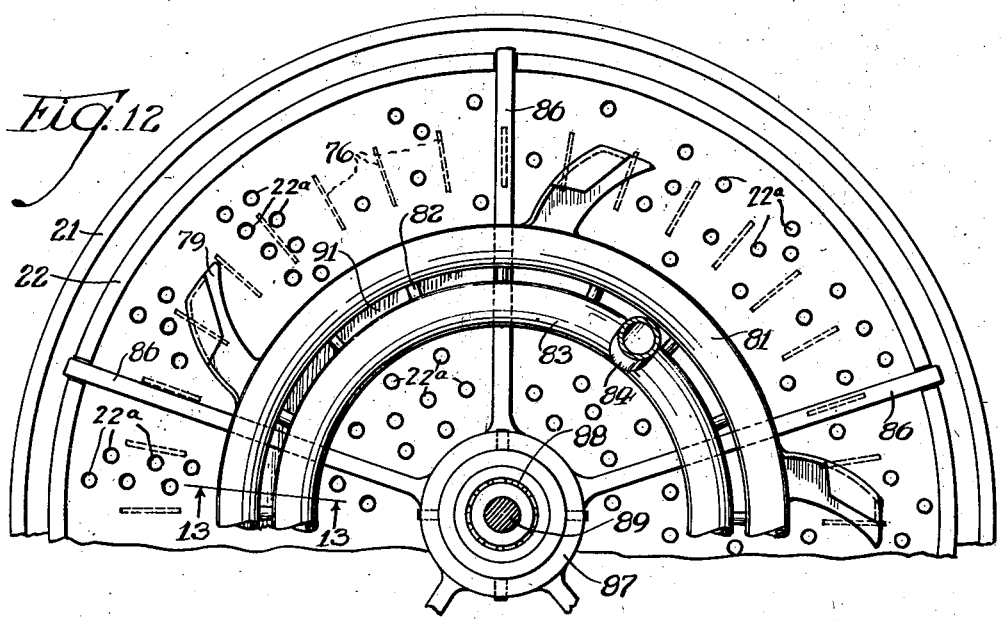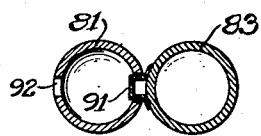

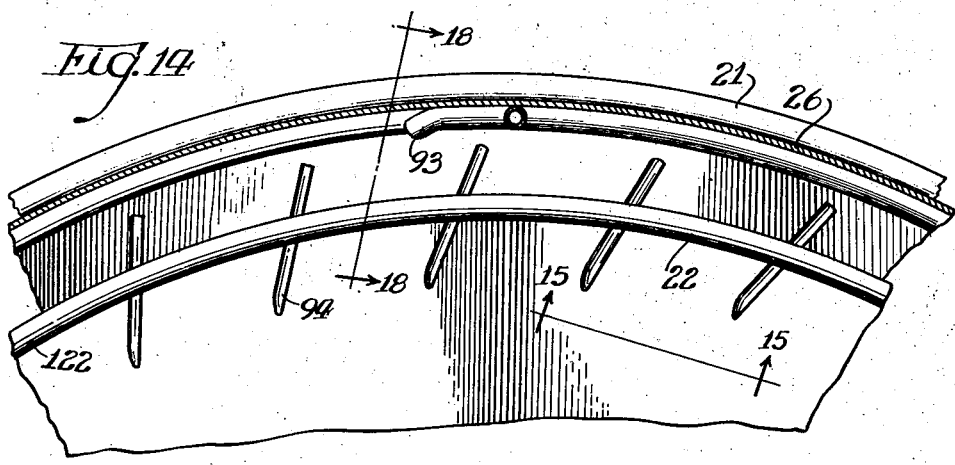
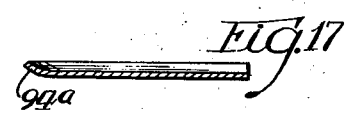
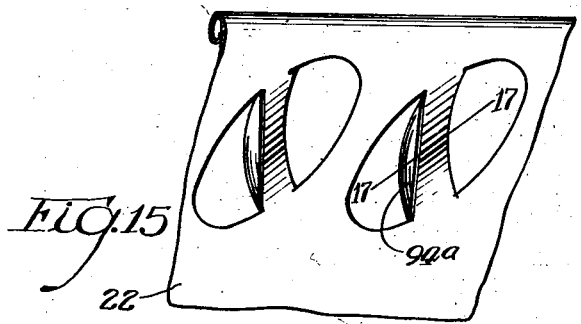
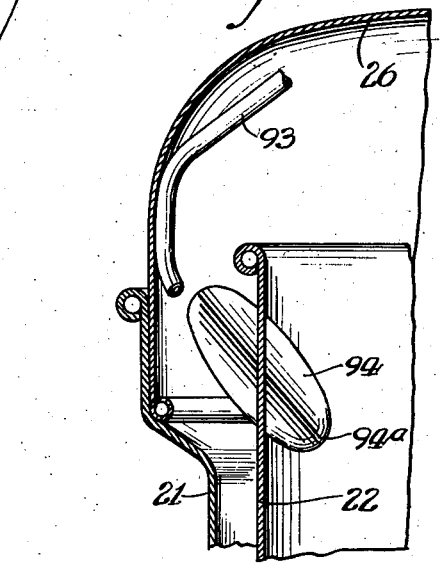
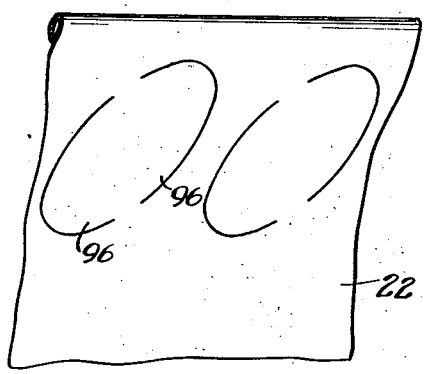

Dec. 1, 1936.  W. B. FORSYTH, JR  2,062,704
DISHWASHING MACHINE
Filed Feb. 20, 1934  9 Sheets-Sheet 9

Inventor,
WILLIAM B. FORSYTH, JR
By  Attys.

Patented Dec. 1, 1936

2,062,704

UNITED STATES PATENT OFFICE 2,062,704

DISHWASHING MACHINE

William B. Forsyth, Jr., Vanderbilt, Mich.,
assignor to Dorothy Edna Forsyth

Application February 20, 1934, Serial No. 712,192

4 Claims. (Cl. 141—9)

My invention relates in general to dish washing machines and more in particular to a dish washing machine in which water is employed as power as well as for cleansing the dishes.

The principal object of my invention is the provision of an improved dish washer.

Another object is the provision of a dish washer which can be manufactured and sold at a very small price, but will, at the same time, be operative to produce very satisfactory results.

Another object is the provision of a dish washing device which will also dry the dishes.

Another object is to operate a dish washer satisfactorily without the use of electric power.

Another object is the provision of improved means for driving a dish washer.

Another object is the provision of an improved means for soaping and washing the dishes.

Other objects and features of the invention will be apparent from a consideration of the following detailed description taken with the accompanying drawings, wherein Fig. 1 is a perspective view partly broken away, showing one embodiment which my invention may take;

Fig. 2 is a plan view with the cover removed but with part of the drive mechanism carried by the cover shown in place;

Fig. 3 is a fragmentary transverse vertical sectional view, the drive and washing features being shown in elevation;

Fig. 4 is an enlarged fragmentary vertical sectional view showing the bearing support for the movable portion of the washer;

Fig. 5 is an enlarged sectional view showing the soaping device;

Fig. 6 is a sectional view taken on the line 6—6 of Fig. 5;

Fig. 7 is a perspective view of a portion of the soaping device;

Fig. 8 is an enlarged plan sectional view of a part of the dish rack;

Fig. 9 is an enlarged vertical sectional view showing a part of the rack in elevation;

Fig. 10 is an enlarged vertical fragmentary transverse sectional view of an optional feature;

Fig. 11 is a sectional view showing a modified form of drive;

Fig. 12 is a fragmentary plan view of the drive shown in Fig. 11;

Fig. 13 is an enlarged sectional view taken on the line 13—13 of Figure 12 showing a feature of the drive;

Fig. 14 is a fragmentary view showing another form of drive;

Fig. 15 is a fragmentary elevational view of the top of the rotatable drum showing the drive elements;

Fig. 16 shows the way in which the drum is blanked out on top prior to forming the drive elements;

Fig. 17 is a longitudinal sectional view of one of the vanes taken on the line 17—17 of Figure 15;

Fig. 18 is an enlarged fragmentary radial section taken on the line 18—18 of Figure 14;

Figure 19:
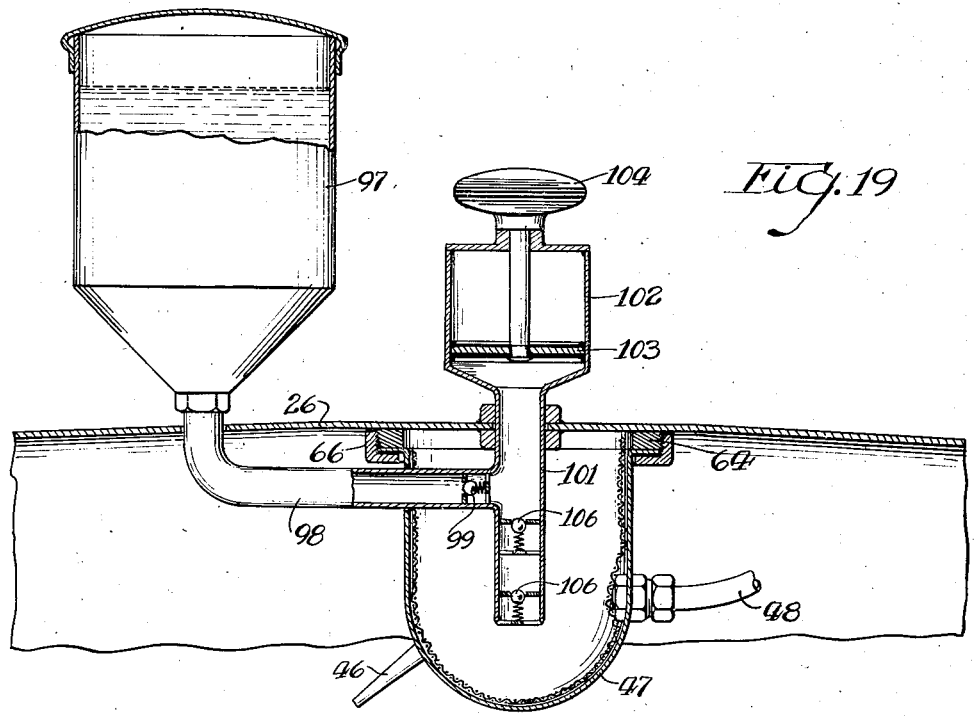
Fig. 19 is a modified form of the soap dispenser for feeding liquid soap.

In accordance with the general principles of the invention, I provide an outside container within which I rotatably support a dish supporting mechanism. A suitable means is provided for utilizing water power for rotating the dish supporting mechanism at a high rate of speed. A spray of water is projected against the dishes while they are rotating, the spray being held stationary and the dishes moving through the stationary spray. The water from the sprayer may be either clear hot water or soapy water. Means is provided for controlling this water so that initially it is soapy but, becoming gradually clear, it rinses the dishes and removes all the soap. The water employed for driving the dishes may be diverted to have some effect in washing the dishes or it may be kept out of contact with the dishes so that it has no washing effect. The dish supporting mechanism being very finely balanced continues to travel at a high rate of speed after the water has been turned off, thereby forming a centrifugal dryer for the dishes.

It will be understood that my invention may have various forms. Figs. 1 to 9, inclusive, however, show a very successful embodiment of the invention which I have operated with great success. I shall first describe this specific embodiment.

Looking at Fig. 1, I have an outer drum-like container 21, in which an inner container 22 is rotatable, the inner container having perforations 22a in its bottom and carrying a dish rack 23 for supporting dishes 24. A cover 26 is mounted on the outer container 21 and may be provided with suitable apertures 27 for observing the dishes.

The outer container 21 and the rotatable container 22 are formed in any suitable way. The rotatable container 22, however, is so mounted as to turn with very little friction within the outer container. Fig. 4 shows one way of mounting the inner container to make it substantially frictionless.

The outer container carries an upstanding axial rod 28, extending through an opening in the bottom of the rotatable container and through a bearing member 29 riveted to the bottom of the rotatable container. A tube-like support 31 is threaded onto the member 29 and carries a threaded cap 32 in a narrow upper portion of which are a pair of bearing balls 33. The lower one of these balls rests upon a recessed portion of the tapered end of the rod 28. In this way, it will be seen that the container 22 is supported greatly above the center of weight so that a natural balance or suspension results, tending readily to maintain the member 22 in equilibrium during rotation. Since, however, the dishes will not be packed so that an absolute balance is obtained, I find it advisable to employ a separate radial member 34 near the bottom end of the container.

I provide water power for driving the rotatable container. The drive in the present embodiment is shown in detail in Figs. 2 and 3. The rotatable container carries near the top thereof a plurality of spaced vanes 36 which water from a pair of nozzles 37 and 38 is adapted to strike. These vanes 36 may be mounted in any suitable way. In the present form, a strip 39 has the vanes 36 secured thereto in any suitable way, as, for example, by welding, and the strip 39 is suitably supported in the rotatable container. Other ways of forming the vanes, however, may be provided.

Water is supplied to the nozzles 37 and 38 through suitable pipes 41 and 42, adapted to carry a good head of water. These pipes are connected to a main pipe 43 through a suitable connection within a housing 44 carried by the cover 26. The pipe 43 is adapted in any suitable way, as for example, by a rubber hose (not shown) to be connected to a suitable source of hot water. Since the pipes 41 and 42 and the nozzles are stationary with the cover, propelling the water against the vanes has the effect of rotating the rotatable container 22. This starts at first relatively slowly, but gradually progresses until even with a few pounds per square inch of water pressure, a very high rate of speed is obtained. With a water pressure of as low as two pounds per square inch, satisfactory operating results are possible.

The water from the spouts or nozzles 37 and 38 has, of course, some effect upon washing. The washing for the main part, however, is accomplished by a sheet of water projected from a flat spray washing nozzle 46 extending from a housing 47 to which water is delivered by a pipe 48 connected to the member 44. In this way, the water from the pipe 43 is utilized partly for driving and partly for washing. The water delivered from the washing nozzle 46 is first soapy and afterwards becomes clear.

Fig. 5 shows one means for soaping the water. The housing 47 has a screen 49. Soap is adapted to be delivered into the housing and confined by the screen and the water from the pipe 48, passing through the soap, is delivered out through the washing nozzle 46 charged with soap. When the soap confined in the housing 47, however, has been used, the water passes through clear and the dishes are rinsed.

As to supporting the soap and delivering it into the chamber formed by the housing 47, I show in Fig. 5 one suitable means for accomplishing this result. Above the bottom or water chamber, in the soap dispensing device, is an intermediate chamber 51 and an upper chamber 52, the intermediate and lower chambers being separated by a transverse partition 53, and the intermediate and upper chambers being separated by a transverse partition 54. Soap is adapted to be supported in the upper chamber and to be delivered down into the intermediate chamber and thence to the lower or water chamber. For delivering the soap, I provide a plunger 56 having valves 57 and 58 suitably adjustable thereon, the valve 57 adapted to close an opening through the partition 54 and prevent soap from passing from the upper to the intermediate chamber, and the valve 58 adapted for uncovering the opening communicating with the lower chamber whereby the soap supported in the intermediate chamber is adapted to drop by gravity into the lower chamber. The soap is provided in flake or powder form so that it will readily feed from one chamber to the other. The dispensing valve is normally supported in the position shown in Fig. 5. It is maintained in this position by a spring 59, one end of which bears against a cap 61 and the opposite end of which bears against the hub of an inserted spider 62.

The soap dispenser may be constructed according to many different forms without departing from the scope of the invention. In the present embodiment, the upper chamber is formed by a cylindrical housing 63 riveted to the top of the cover. A ring 64 is also secured to the lower side of the cover, and a clamping nut 66 holds the lower housing 47, the partition 53 and washers to complete the housing assembly. The partition 54 is brazed or welded in position on the inside of the upper housing 63 although, of course, it may be secured in position in any suitable way. A cover 67 frictionally engages the outside of the upper housing 63, but has a large enough central opening to pass the cap 61.

The water admitted to the lower chamber through the pipe 48 almost all passes through the washing spray nozzle 46. There will be some dishes placed, however, so that they will not be struck by the spray passing from the washing nozzle 46. By providing a loose fit at the bottom for the plunger I find that I discharge enough water around the periphery of the plunger to wash the dishes, and which dishes are not reached by the water from the washing nozzle 46.

The nozzle 46 is flat and narrow so that it discharges the water in substantially a sheet. It may be set at any suitable angle, but preferably an angle so that it has the greatest effect in causing the water to strike all parts of the dishes.

The rack 23 is supported within the rotatable container 22 so as to move therewith. It is shaped to support dishes in tiers, as shown in Fig. 1. Preferably it is formed of heavy wire. It has the portions 23a between which the dishes are supported and outstanding projections 23b formed by bending the wire to support the bottoms of the dishes so that they are prevented from falling over as the centrifugal force acts upon them during their rotation.

In the operation of the device of the present invention, the dishes are placed in the tray, the cap 61 depressed to admit soap to the bottom chamber, and the pipe 43 connected to a source of hot water, preferably at relatively high pressure. Immediately a spray of soapy water is projected from the washing nozzle 46 and clear water will be discharged through the nozzles 37 and 38 and start the rotatable container with the dishes moving at a relatively slow rate of speed. As the dishes rotate slowly to start with, the soapy water is projected over all of the dishes, thus giving them the start of a complete washing. As the speed is gradually increased, however, the amount of soap in the water is diminished, so that by the time high speed is reached, the water will be almost clear. It can then be allowed to run for a minute or two, depending upon how soiled the dishes are, and the water then turned off. During the washing, the water is discharged from the inner container 22 through perforations 22a and from the outer container 21 through a discharge spout 68, so that instead of employing the same washing water over and over again, the water is always being replaced and the water that has been projected against the dishes passes through the discharge spout 68. Some of the water which strikes the vanes 36 has some washing effect during the time that the washing is taking place. After the water has been turned off, the rotatable container 22, with the rack and dishes, continues to rotate at a high rate of speed so that the dishes are then dried by centrifugal force. Being allowed to remain in the container, they will be clear, clean and substantially sterilized when required.

Two modifications are shown in Fig. 10. Instead of discharging the water in a flat spray from the washing nozzle, I can discharge it in the form of a series of aligned jets so that the effect is substantially the same as if a flat spray were provided. As Fig. 10 shows, this can be accomplished by providing a plurality of aligned ports 71 in the washing nozzle 46.

Fig. 10 also shows means for aligning the bearings for the rotatable container if irregularities in the distribution of weight make it necessary to provide an upper bearing instead of merely suspending the rotatable container. The cap 32 is provided with an annular top recess into which a stud 72 extends. This stud is journaled in a casing 73 carried by the bottom soap dispensing housing 47. A radial ball bearing 74 can be placed between the casing 73 and the stud 72. Since this assembly is carried by the cover, it is clear that when the cover is placed in position, the assembly of Fig. 10 is obtained and a top bearing or support is provided. This construction is illustrative entirely and merely shows a manner in which this principle can be applied to the present dish washer, if there appears to be a necessity therefor.

Figs. 11, 12 and 13 show a modification of the drive in which the vanes and substantially all of the drive is carried by the cover with a provision for attaching the drive means to the rotatable inner container 22 when the cover is placed in position.

Looking at Figs. 11 and 12, the cover 26 has a plurality of vanes 76 on its underside against which water admitted to the cover through a pipe 77 is adapted to be projected. This pipe 77 feeds to a distributing connection 78, so that part of the water is taken through the pipe 48 and fed to the lower soap dispensing housing 47, thence this water is delivered through the washing nozzle 46, as in the originally described embodiment.

For driving the rotatable container, I provide a number of spouts 79 carried on the outside of an annular pipe 81, which pipe is supplied with water through a plurality of smaller pipes 82 connected to a stationary annular pipe 83 supplied with water from a substantially vertically disposed pipe 84 connected to the distributing connection 78. The pipe 81 is connected in any suitable way as by welding or otherwise to a number of arms 86, which arms are adapted to have their ends set onto slots in the upper edge of the rotatable container 22. The arms 86 extend radially from a hub portion 87, journaled through a ball race 88 to a downwardly projecting stud 89 carried by the soap dispensing housing.

Referring more fully to the connection between the stationary pipe 83 and the rotatable pipe 81, the small pipes 82 extend into an annular slot on the inside of the rotatable pipe 81. Between the pipes 82, the slot in the pipe 81 is sealed by a flange 91 carried by the pipe 83. The short pipes 82 do not fit tightly into the slot in the rotatable pipe or wheel, but some clearance is allowed to permit easy movement. The flange between the short pipes has about the same clearance.

The spouts 79 are shaped so that when they receive water from the rotatable pipe 81 through ports 92, they move the water in the form of an arc so that as the water passes from the spouts it strikes the vanes 76. Because of the proximity of the discharge end of the spouts 79 to the stationary vanes 76 and because the water will well up in said discharge end, a force will be transmitted back through said water from the vanes 76 to the spouts 79 and thereby have the effect of increasing the speed of rotation of the pipe 81. In this case also, as in the first modification, movement starts relatively slowly but gradually accelerates until finally the rotatable container is travelling at a high rate of speed.

In Figs. 14 to 18, I show a very simple arrangement of the drive in which the water, after it functions as a drive, is available for washing the dishes and has some considerable value in this respect. In this form, the nozzles 93 (one is shown in Figs. 14 and 18, but there may be several and should be more than one) are secured to the upper outside portion of the cover and are adapted to strike from the outside against vanes 94, so that after passing over the vanes, the water is deflected toward the inside or center of the rotatable container 122. This path of the water is possible because there is an open space at each vane to permit the water to pass directly through the wall of the rotatable container.

Now in actual practice, the vanes in this modification are best constructed from the material of the rotatable container itself. There are several ways in which this effect can be accomplished. I prefer, however, to form up the vanes as shown in the drawings, first, by blanking out tabs 96 which will be formed up into vanes and then in a subsequent operation to form these vanes to substantially the shape shown in the remaining figures. It will be noted that the water is made to pass inwardly and downwardly from the nozzles and so the vanes are set to get the greatest effect from the force of the water in the direction in which the water moves. The vanes are transversely arcuate, as indicated in Fig. 17, which is a longitudinal central section through one of the vanes showing the overall length thereof. The end of the vane 94a is slightly cupped (Fig. 15) to obtain a greater driving effect from the water. It will be understood, however, that the specific shape of the vanes and even the manner in which they are formed up may be modified without departing from the invention.

Fig. 19 is a modification of the soaping device in which liquid soap may be employed instead of solid soap in comminuted form.

The liquid soap is held in a container or reservoir 97 and is adapted to be discharged into the lower casing 47 through a pipe 98. Normally the soap is prevented from being discharged by a spring pressed ball valve 99 in the pipe 98. This pipe 98 is connected to a vertically disposed pipe 101, which is surmounted by a cylinder 102 in which a piston or plunger 103 is reciprocable by a hand piece 104. Below the point where the pipe 98 fits into the pipe 101 are ball type check valves 106 so arranged as to prevent pressure from underneath from forcing water into the pipe 101. It is quite evident that the soap may be fed from the reservoir by first pulling up on the plunger 103, thereby releasing the check valve 99 and allowing the pipe 101 and part of the cylinder 102 to fill with soap. The plunger is then pushed downwardly causing the valve 99 to be closed and forcing the valves 106 open, thereby discharging the soap through the valves 106 and into the casing 47.

Figure 20:
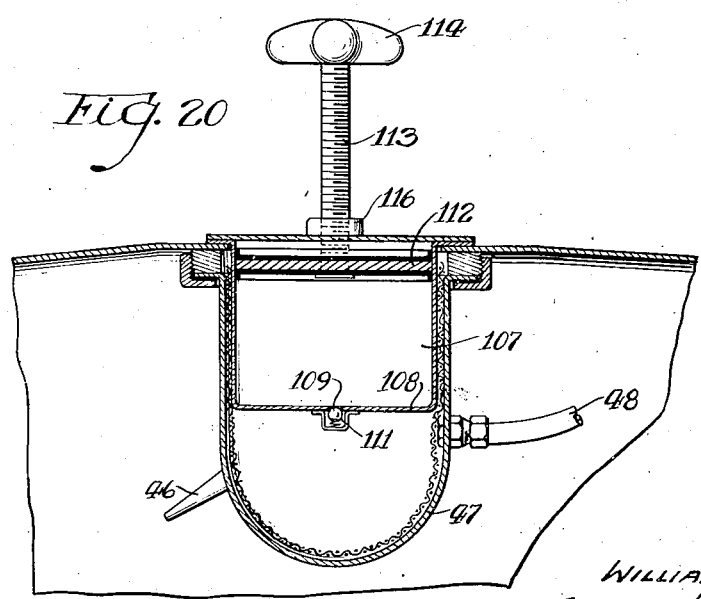
Fig. 20 is a modification employed for feeding so called green or soft soap.

In Fig. 20, I show means for utilizing so called green or soft soap in my dish water. Within the casing 47 and at the top thereof, I mount a cylinder 107 having a bottom 108 apertured at 109, the aperture being normally closed by a spring pressed ball valve 111. A plunger 112 in the cylinder 107 is adapted to be forced downwardly by a screw 113 operated by a hand wheel 114, the screw being threaded in a nut 116 carried on the cover. It is clear that by turning the hand wheel 114, soft soap contained in the cylinder 107 can be discharged through the aperture 109 and, when the available soap has been discharged, the ball valve will again close the aperture and prevent water from being forced up into the cylinder 107.

From the foregoing description including the modifications it is clear that the actual structure of my dish washing device can be modified considerably while still maintaining the basic principles thereof. For the most part the washing takes place by moving the dishes through a stationary stream of water that strikes them substantially on both sides as they move therethrough. Some of the water from the driving mechanism may have an effect in washing the dishes particularly after the rotatable portion of the mechanism has attained a relatively high rate of speed.

The action of the washer can be noted through the windows 27. The dishes are moving at such a high rate of speed, however, that it is impossible to see whether or not the dishes are clean. It is possible, however, to determine whether or not the water being delivered to the dishes is soapy or clear and I have found that when all the soap has been exhausted and the water runs clear for a short time the dishes will have been completely washed and rinsed. When unusually soiled dishes are being washed it may be advisable to employ a second "shot" of soap, but in general only one supply of soap for each washing is sufficient. After the water has been turned off the action of the rotatable portion of the device dries the dishes. Since the dishes themselves have some weight they produce a flywheel effect which will keep the rotatable member moving for a relatively great length of time and at high speed. For the greatest drying effect the windows 27 should be opened. When these windows are opened the rotation of the dishes and support therefor including the rotation of the vanes 36 causes a rapid movement of air through the outer casing. The direction and velocity of movement can be determined by the action of the vapor from the dishes. In general, the movement of the air is upwardly through the water outlet 68 and through the ports formed by the opening of the windows 27. Sometimes the air appears to move, however, into one port and out through the other. By a combination of this movement of the air plus the centrifugal movement of the water on the dishes, the dishes are dried in a relatively short time.

I refer throughout to washing dishes, but it is obvious that the washing device may be employed for washing other articles of the same general character.

I describe my invention in detail to permit those skilled in the art to practice the same, but it is obvious that I do not limit myself to the specific forms shown but only as the appended claims indicate.

What I claim as new and desire to protect by United States Letters Patent is:

1. In a dish washing machine, an outer casing, an inner dish supporting frame, a cover for the outer casing, a chamber on the under side of the cover, means for connecting said chamber to a source of hot water under pressure, a chamber above the cover adapted to contain soap, means for delivering a relatively small quantity of soap from the upper chamber to the lower chamber, means for directing the water from said lower chamber in a steady stream against the dishes, and means for rotating said dish supporting frame.

2. In a dish washing machine, an outer casing having a cover, an inner dish supporting frame rotatably mounted within the outer casing, a chamber carried on the under side of the cover of the outer casing and having a connection with a source of hot water under pressure, a plurality of outlets from said chamber, some of said outlets terminating in nozzles directed toward the periphery of the inner casing whereby to rotate the same under pressure of the water streams issuing therefrom, a chamber adapted to contain soap, a connection from the first chamber to the soap chamber, means in said soap containing chamber for delivering small quantities of soap into the water coming from the first chamber to the soap chamber, and an outlet from the soap chamber directed toward the dishes.

3. In a dish washing machine, an outer casing having a cover, an inner dish supporting frame rotatably mounted within the outer casing, a water supply chamber carried on the under side of the cover of the outer casing and having a connection with a source of hot water under pressure, a plurality of outlets from said chamber, a series of vanes carried by the inner dish supporting frame, some of said outlets terminating in nozzles directed toward said vanes whereby to rotate said dish supporting frame under pressure of water from said nozzles, a compartmented chamber, one compartment thereof being adapted to contain a supply of soap and means for delivering small quantities of soap therefrom to another compartment, and a connection from the hot water supply chamber to said other compartment; said other compartment having a nozzle directed toward the dishes to direct a stream of soapy water thereon.

4. In a dish washing machine, an outer casing having a cover, an inner dish supporting frame rotatably mounted within the outer casing, a water supply chamber carried on the under side of the cover of the outer casing and having a connection with a source of hot water under pressure, a plurality of outlets from said chamber, a series of vanes carried by the inner dish supporting frame, some of said outlets terminating in nozzles directed toward said vanes whereby to rotate said dish supporting frame under pressure of water from said nozzles, a compartmented chamber on the under side of said cover, one compartment thereof being adapted to contain a supply of soap, manual means for delivering small quantities of soap from said compartment to another compartment, and a connection from the hot water supply chamber to said latter compartment; said latter compartment having an outlet nozzle directed toward the dishes in the dish supporting frame to direct a stream of soapy water thereon.

WILLIAM B. FORSYTH, Jr.